(12) United States Patent
Heilig et al.

(10) Patent No.: US 10,664,874 B2
(45) Date of Patent: May 26, 2020

(54) NETWORK PROXY BIDDING SYSTEM

(71) Applicant: Google LLC, Mountain View, CA (US)

(72) Inventors: Joerg Heilig, Los Altos, CA (US);
Scott Spencer, New York, NY (US);
Rahul Bafna, New York, NY (US);
Wayne W. Lin, San Francisco, CA
(US)

(73) Assignee: Google LLC, Mountain View, CA (US)

( * ) Notice: Subject to any disclaimer, the term of this patent is extended or adjusted under 35 U.S.C. 154(b) by 372 days.

(21) Appl. No.: 15/464,992

(22) Filed: Mar. 21, 2017

(65) Prior Publication Data

US 2017/0193562 A1 Jul. 6, 2017

Related U.S. Application Data

(63) Continuation of application No. 12/607,690, filed on Oct. 28, 2009, now Pat. No. 9,639,890.

(60) Provisional application No. 61/110,387, filed on Oct. 31, 2008.

(51) Int. Cl.
*G06Q 30/02* (2012.01)
*G06Q 30/08* (2012.01)

(52) U.S. Cl.
CPC ......... *G06Q 30/0275* (2013.01); *G06Q 30/02* (2013.01); *G06Q 30/08* (2013.01)

(58) Field of Classification Search
None
See application file for complete search history.

(56) References Cited

U.S. PATENT DOCUMENTS

| | | |
|---|---|---|
| 2006/0242017 A1 | 10/2006 | Libes et al. |
| 2006/0253434 A1 | 11/2006 | Beriker et al. |
| 2006/0293995 A1 | 12/2006 | Borgs et al. |
| 2007/0055606 A1 | 3/2007 | Ausubel et al. |
| 2007/0179856 A1* | 8/2007 | O'Kelley ........... G06Q 30/0247 705/14.46 |
| 2008/0097838 A1 | 4/2008 | Zhouchen et al. |

(Continued)

FOREIGN PATENT DOCUMENTS

| KR | 10-2005-0026939 | 3/2005 |
|---|---|---|
| KR | 10-2006-0008676 | 1/2006 |

OTHER PUBLICATIONS

Hao, Shangyou: A study of Basic Bidding Strategy in Clearing Price Auctions; IEEE Proceedings 1999. Available at: https://ieeexplore.ieee.org/abstract/document/779385 (Year: 1999).*

(Continued)

*Primary Examiner* — Katherine Kolosowski-Gager
(74) *Attorney, Agent, or Firm* — Fish & Richardson P.C.

(57) ABSTRACT

Methods, systems and computer program products for submitting a network proxy bid and replacing the network proxy bid with an actual bid associated with advertisement placement are described. In some implementations, instead of submitting a static bid, an advertiser can submit a network proxy bid to an advertising exchange. A network proxy bid can indicate to the advertising exchange that the advertiser wishes to receive a call back from the advertising exchange when an impression matching targeting criteria specified by the advertiser becomes available. The advertiser then can calculate and submit an actual static bid to replace the network proxy bid in response to the call back.

8 Claims, 5 Drawing Sheets

(56) References Cited

U.S. PATENT DOCUMENTS

| | | |
|---|---|---|
| 2008/0103969 A1 | 5/2008 | Flake et al. |
| 2009/0012877 A1* | 1/2009 | Glasspool .......... G06Q 30/0601 |
| | | 705/26.3 |
| 2009/0299831 A1* | 12/2009 | Li ........................ G06Q 10/025 |
| | | 705/14.1 |
| 2010/0114716 A1 | 5/2010 | Heilig et al. |

OTHER PUBLICATIONS

Authorized Officer Seong Won Yuk, Notification of Transmittal of the International Search Report and the Written Opinion of the International Searching Authority, or Declaration for Application No. PCT/US2009/062858, dated Jun. 15, 2010, 11 pages.

Authorized Officer Masashi Honda, International Preliminary Report on Patentability, Application No. PCT/US2009/062858, dated May 12, 2011, 6 pages.

* cited by examiner

NETWORK PROXY BIDDING SYSTEM

CROSS-REFERENCE TO RELATED APPLICATIONS

This application is a continuation of and claims priority to U.S. application Ser. No. 12/607,690, filed on Oct. 28, 2009, which claims priority to U.S. Provisional Application Ser. No. 61/110,387, filed on Oct. 31, 2008. The entire contents of each are hereby incorporated herein by reference.

TECHNICAL FIELD

This subject matter is generally related to online advertising auctions.

BACKGROUND

Traditionally, bidding on advertisement ("ad") placement is performed by placing a static bid on inventory (e.g., impressions of participating publishers). Generally, such a bid is associated with certain targeting criteria. For example, the bid may be associated with contextual keywords or a specific placement on a webpage.

While this bidding process works well for individual advertisers that plan and manage their respective ad campaigns, the process is inefficient for buyers who are bidding on behalf of a large number of advertisers, or ad networks that manage millions of ad campaigns. If a buyer wants to buy impressions from a publisher network, the buyer may place a static bid with the publisher network or with a host of the publisher network. Placing static bids, however, may expose sensitive bidding information associated with the buyer to the publisher network.

Additionally, ad campaigns may change frequently depending on various conditions such as consumer needs, market trends and geographic locations. When changes in the buyer's campaigns arise, multiple updates of the static bids are needed to reflect the changes in the ad campaigns.

Importantly, the value of an impression depends on a number of factors, such as geographic location, time of day, and the like. Hence, it is difficult to pre-compute a correct bid for an advertisement placement and use the pre-computed bid as a static bid. Often, the pre-computed bid does not actually reflect the true value of the bid, resulting in sub-optimal performance by forcing the buyer to overpay on some bids or underestimate the value of other bids.

SUMMARY

In general, the subject matter of this application relates to online advertising auctions. One aspect of the subject matter described in this specification can be embodied in a computer-implemented method that includes receiving request data representative of a request for placement of an advertisement with published content provided by a publisher; determining candidate bid data, the candidate bid data representative of a set of candidate bids for the advertisement placement; determining whether a candidate bid in the set of candidate bids is a network proxy bid provided by an advertiser; if the candidate bid is a network proxy bid, sending information to the advertiser relating to the advertisement placement; receiving actual bid data representative of an actual bid from the advertiser, the actual bid being determined based on the information; and replacing the candidate bid that is representative of the network proxy bid with the actual bid that is representative of the actual bid so that the candidate bid data includes the actual bid data. Other embodiments of this aspect include corresponding systems, apparatuses, and computer program products.

These and other embodiments can optionally include one or more of the following features. The method further includes conducting an auction for the advertisement placement using the actual bid. Conducting an auction for the advertisement placement includes conducting an auction for the advertisement placement using the actual bid and the candidate bids.

The method further includes determining a highest bid based on the candidate bids including the actual bid; and selecting an advertisement associated with the highest bid for the advertisement placement. Determining a highest bid includes using revenue sharing information to adjust the value of one or more of the candidate bids and determining a highest bid using the adjusted values. The method further includes forwarding the selected advertisement to a user system for presentation.

Sending information includes sending information associated with at least one of an IP address, cookie data, contextual information, user browser data, and presentation information associated with an impression. The method further includes determining whether the candidate bid is a weak bid, the weak bid having a maximum value that is below a predetermined threshold, the maximum value being specified by the advertiser. Sending information to the advertiser includes sending information to the advertiser relating to the advertisement placement if it is determined that the candidate bid is a network proxy bid but not a weak bid.

The method further includes determining a likelihood of the advertiser to return a competitive bid, the competitive bid having a bid value that is above a predetermined threshold. Determining a likelihood of the advertiser to return a competitive bid includes determining the likelihood based on bidding history associated with the advertiser. The method further includes charging the advertiser a fee regardless of whether the actual bid is a winning bid among the candidate bids. Receiving an actual bid from the advertiser includes: receiving a code associated with the actual bid; executing the code to obtain the actual bid; and using the actual bid for bidding on the impression.

Another aspect of the subject matter described in this specification can be embodied in a computer-implemented method that includes registering request data representative of a request of a network proxy bid; receiving data associated with an impression in response to the registered network proxy bid; determining a value of the impression based on the received data; and generating actual bid data representative of an actual bid to replace the network proxy bid for bidding on the impression based on the determined value. Other embodiments of this aspect include corresponding systems, apparatuses, and computer program products.

These and other embodiments can optionally include one or more of the following features. Registering a network proxy bid includes registering a network proxy bid that specifies one or more impression parameters. Receiving data associated with an impression in response to the registered network proxy bid includes receiving data associated with an impression matching the specified impression parameters.

Determining a value of the impression includes comparing the impression against one or more impressions associated with an advertisement campaign to determine the value of the impression. Generating an actual bid includes generating the actual bid based on the comparison. The received data specifies an auction type. Generating an actual bid includes translating the actual bid from a first bid type to a second bid type based on the specified auction type.

Another aspect of the subject matter described in this specification can be embodied in a system that includes: a processor; a computer-readable medium operatively coupled to the processor and including instructions, which, when executed by the processor, causes the processor to perform operations comprising: receiving a request for placement of an advertisement with published content provided by a publisher; determining a set of candidate bids for the advertisement placement; determining whether a candidate bid in the set of candidate bids is a network proxy bid provided by an advertiser; if the candidate bid is a network proxy bid, sending information to the advertiser relating to the advertisement placement; receiving an actual bid from the advertiser, the actual bid being determined based on the information; and replacing the network proxy bid with the actual bid. Other embodiments of this aspect include methods, apparatuses, and computer program products.

Another aspect of the subject matter described in this specification can be embodied in a system that includes: a processor; a computer-readable medium operatively coupled to the processor and including instructions, which, when executed by the processor, causes the processor to perform operations comprising: registering a network proxy bid; receiving data associated with an impression in response to the registered network proxy bid; determining a value of the impression based on the received data; and generating an actual bid to replace the network proxy bid for bidding on the impression based on the determined value. Other embodiments of this aspect include methods, apparatuses, and computer program products.

The details of one or more embodiments are set forth in the accompanying drawings and the description below. Other features, objects, and advantages will be apparent from the description and drawings, and from the claims.

DESCRIPTION OF DRAWINGS

Like reference symbols in the various drawings indicate like elements.

DETAILED DESCRIPTION

Figure 1A:
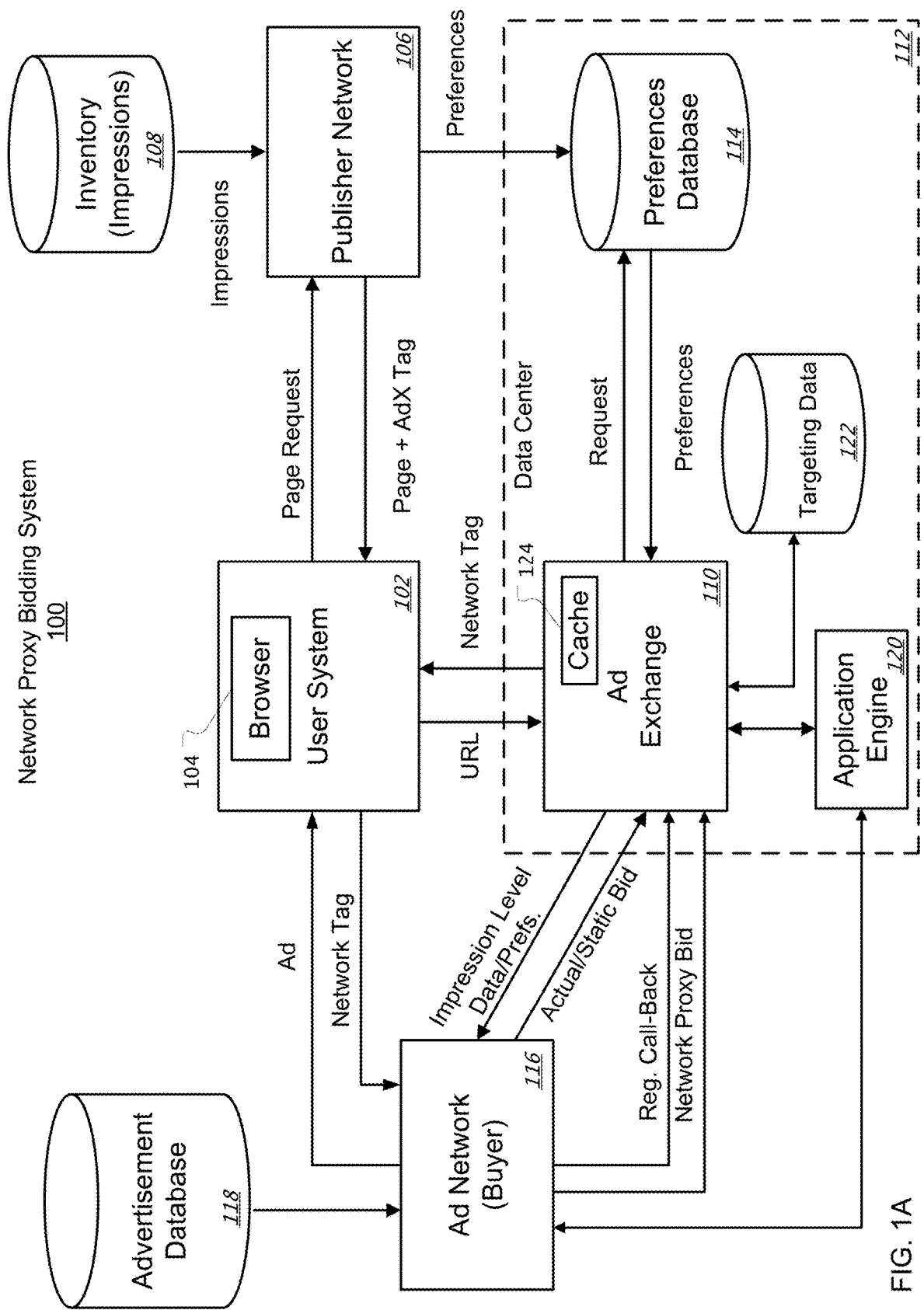
FIG. 1A shows an example network proxy bidding system.

FIG. 1A shows an example of a network proxy bidding system 100 for submitting proxy advertising bids and calculating actual advertising bids. The system 100 includes a user system 102, for example a desktop computer, laptop computer, or mobile device. The user system 102 can include a browser 104 for presenting content (e.g., webpages) to a user of the user system 102. The browser 104 may be configured to request a webpage from a publisher (e.g., publisher network 106, which is one or more computer devices run by a publisher entity). For example, when the user types a URL for a webpage into the browser 104, the browser 104 requests the webpage from the publisher network 106. In other implementations, the user may view a webpage using the browser 104 and select a link contained in the webpage. Selecting the link causes the browser 104 to request a second webpage associated with the link from the publisher network 106.

The publisher network 106 can receive a page request from the user system 102 and access an inventory database 108. The inventory database 108 can include a number of advertising impressions. An impression can be one potential view of an advertisement by a user, or refer to a single instance of serving an advertisement. An advertisement placement may be on a webpage where one or more advertisements can be displayed.

The publisher network 106 provides the requested webpage to the user system 102. The webpage can include an advertising exchange tag. In some implementations, the advertising exchange tag can be a code segment included in HTML code for the webpage. For example, the advertising exchange tag can be a code segment of JavaScript. Upon loading the webpage, the browser 104 can execute the advertising exchange tag code segment. The advertising exchange tag can indicate an advertising exchange 110. The advertising exchange 110 can be configured to provide a network tag for an advertiser (e.g., an advertising network 116, which is one or more computer devices run by an advertising entity) that can be contacted to provide an advertisement to be displayed on the webpage. The user system 102 can contact the advertising exchange 110 and provide impression level data relating to an impression, such as for example, a URL of the webpage.

In some implementations, the publisher network 106 may employ a secondary system (e.g., an ad server, not depicted) that determines when to include an advertising exchange tag that indicates the advertising exchange 110 based on parameters associated with one or more impressions stored in the inventory database 108. The advertising exchange tag can direct a publisher network to an advertising exchange when, for example, impression inventory has not been sold to an advertiser. Such decisions can be made by logic entered into the secondary system. For example, if a particular set of impression inventory has been sold to a first advertiser, the secondary system can indicate that an advertisement associated with the first advertiser should be displayed on a webpage associated with the set of impression inventory. If a set of impression inventory has not been sold to an advertiser, the publisher network 106 can include an advertising exchange tag that indicates an advertising exchange (e.g., the advertising exchange 110) with the webpage.

In some implementations, an advertising exchange may not represent any one seller or buyer, but rather a collection of multiple sellers of impression inventory and multiple buyers of impression inventory, and can be transparent regarding inventory pricing.

By contrast, in some cases, an advertising network can represent a single buyer or seller of advertising inventory, and may be able to restrict which advertisers or publishers it is willing to work with. In some implementations, an advertising network may not be transparent regarding revenue share, methodologies, optimization technologies or inventory selection. In some implementations, an advertising network can block selective inventory, bids, or targeting criteria.

Auction and Static Bid

The advertising exchange 110 can receive request data representative of a request for placement of an advertisement with published content provided by a publisher from the user system 102. For example, the advertising exchange 110 can receive impression level data related to an impression from the user system 102. The advertising exchange 110 can conduct an auction to allow one or more advertisers (e.g., advertising network 116) to bid on the impression. The advertising exchange 110 can identify one or more candidate bids from the one or more advertisers and compare the candidate bids to select a winning bid for the impression. The advertising exchange 110 can provide a network tag associated with an advertiser that submitted the winning bid to the user system 102. The advertising exchange 110 can be included in a data center 112. The data center 112 can include, for example, additional systems, servers, and databases that can be accessed by the advertising exchange 110 during an impression bidding process.

In some implementations, prior to the user system 102 contacting the advertising exchange 110, one or more advertisers can submit one or more static bids to the advertising exchange 110. A static bid can be a monetary value that an advertiser is willing to pay for an advertising impression. The value of bids may be one or more of many pricing types. Pricing types of bids may include, but are not limited to, cost per impression (CPI); cost per 1,000 impressions (CPM); cost per action (CPA); cost per click (CPC); cost per lead (CPL); cost per order (CPO); or cost per sale (CPS). CPI represents a cost to an advertiser for one impression. For example, a CPI bid of $1.50 may indicate that an advertiser is willing to pay $1.50 for an impression. CPM pricing is based on the number of views, or impressions, that an advertisement may receive over a period of time. For example, a CPM bid of $50 may indicate that an advertiser would pay $50 for every 1,000 times an advertisement is displayed. CPA pricing is based on the number of actions that occur in response to an advertisement. An action may be defined as a sales transaction, a customer acquisition, or a click on the advertisement. CPC pricing is based on the number of times an advertisement is clicked or selected. For example, an advertisement may be associated with a bid to pay 10 cents for every click on the advertisement. CPL pricing is based on the number of new leads generated by an advertisement. For example, an advertiser may pay for every user that clicks on an advertisement and successfully completes a form on a webpage associated with the advertisement. CPO pricing is based on the number of orders received as a result of an advertisement. CPS pricing is based on the number of sales transactions that an advertisement generates.

In some implementations, in addition to a bid value, a static bid may be associated with targeting criteria, e.g., contextual keywords or specific placements on a webpage. For example, an advertiser can submit a static bid for an advertising campaign for fishing equipment and boating retailers. The static bid can be associated with targeting criteria related to fishing and boating. As another example, a static bid can be associated with impressions placed at a particular location on a webpage, e.g., the top of a webpage. In some implementations, targeting criteria can include geographic restrictions. For example, a static bid can include targeting criteria indicating that only impressions associated with user systems located in California are relevant to the static bid.

As previously described, the static bid process works well for individual advertisers that manage their own campaigns. However, advertising networks that manage many campaigns may not get good results due to the unavailability of impression level data prior to the auction.

Network Proxy Bid

In some implementations, an advertising network 116 can submit data that is representative of a network proxy bid to the advertising exchange 110. A network proxy bid can be used to indicate to the advertising exchange 110 that the advertising network 116 has registered a call back with the advertising exchange 110. The advertising network 116 can calculate and submit actual bid data representative of an actual static bid in response to the call back. A network proxy bid can be associated with the targeting criteria described above for static bids. In some implementations, a network proxy bid can indicate particular areas of interest. For example, a network proxy bid can indicate an interest in advertising impressions associated with cooking. The network proxy bid can indicate to the advertising exchange 110 to make a call back to the advertising network 116 when an impression associated with cooking is available.

The data center 112 can include a preferences database 114. In some implementations, prior to the user system 102 contacting the advertising exchange 110, the publisher network 106 can populate the preferences database 114 with preference data associated with webpages published by the publisher network 106. In some implementations, the preference data can be associated with one or more webpages, websites, URLs or impressions. The preference data provided by the publisher network 106 can include advertiser exclusion preferences and creative restrictions. Advertiser exclusion preferences can include a list of one or more advertisers or advertising networks that are excluded from displaying advertisements on the webpage. For example, the webpage being loaded by the browser 104 may be part of a website owned and operated by an automaker (e.g., Chevrolet®). In this example, the preference information stored in the preferences database 114 may indicate that advertisements for other automakers, such as Ford® and Toyota®, may not be displayed on the webpage. As another example, the webpage may be part of a child friendly website. In this example, the preference information stored in the preferences database 114 may indicate that advertisements containing adult content are restricted from being displayed on the webpage.

Creative restrictions may indicate advertisement formats or layouts that are excluded from being displayed as part of the webpage. For example, the preference data can indicate that advertisements that include video or audio content are excluded from being displayed on the webpage. As another example, the preference data can indicate that expandable advertisements are excluded from being displayed on the webpage. The advertising exchange 110 can send a request to the preferences database 114 to request preference data associated with the URL received from the user system 102. The preferences database 114 can provide preference data to the advertising exchange 110 in response to the request.

In some implementations, the advertising exchange 110 may extract contextual information, such as keywords and targeting information, from the webpage associated with the URL received from the user system 102. In some implementations, the contextual information can be representative of main content of the webpage. In some implementations, the advertising exchange 110 can access a targeting data database 122 to request contextual information and targeting information associated with the URL. The targeting data database 122 can include keywords and other targeting information associated with a URL and provide the keywords and targeting information to the advertising exchange 110. For example, targeting information stored in the targeting data database 122 may indicate that a URL is associated with a webpage about coffee.

As discussed above, an advertisement placement may be associated with an impression. In some implementations, the advertising exchange 110 may determine a position of the advertisement placement relative to an associated webpage. For example, the advertising exchange 110 can determine that an impression is located on the left side of a webpage. In some implementations, the advertising exchange 110 can compare the contextual information, targeting information and placement information to targeting criteria associated with one or more bids. For example, keywords and targeting information extracted from a webpage can be related to camping and an impression associated with the webpage can be located at the top of the webpage. The advertising exchange 110 can identify candidate bid data representative of candidate bids associated with targeting criteria for camping and outdoor recreation related keywords and placement criteria for impressions located at the tops of webpages. The candidate bid data representative of candidate bids can be, for example, static bids or network proxy bids. In some implementations, the advertising exchange 110 can compare candidate bids to preference data received from the preferences database 114 and exclude bids based on the comparisons. For example, the preference data can include advertiser exclusion preferences indicating that advertisements from Toyota are excluded from being displayed on the webpage. In this example, the advertising exchange 110 can exclude bids associated with advertising campaigns that include Toyota.

In some implementations, the advertising exchange 110 can identify targeting criteria associated with the network proxy bid submitted by the advertising network 116 as relating to contextual information, targeting information, and placement information associated with an impression. For example, an impression associated with the user system 102 can be associated with keywords that relate to targeting criteria associated with the network proxy bid. The advertising exchange 110 can make a call back to the advertising network 116 requesting an actual static bid. The call back can include preference data and impression level data associated with the impression. The preference data can include advertiser exclusion preferences and creative restrictions received from the preferences database 114. The impression level data can include information such as a URL associated with the impression, an IP address of the user system 102, a geographic location of the user system 102, keyword information associated with the impression, contextual information associated with the impression, and browser parameters of the browser 104.

In some implementations, the advertising network 116 can exclude advertisers associated with an advertising campaign based on preference data received from the advertising exchange 110. For example, preference data can indicate that fast food restaurants are excluded from submitting bids for an impression. The advertising network 116 can exclude fast food restaurant advertisers when calculating an actual static bid for the impression. As another example, preference data can indicate that advertisements that include video content are excluded. The advertising network 116 can exclude advertisements that include video content when calculating an actual static bid for the impression.

In some implementations, the advertising network 116 can identify a non-excluded advertiser that best matches the criteria received from the advertising exchange 110. For example, the advertising network 116 can submit a network proxy bid associated with an advertising campaign for a plurality of automobile related advertisers to the advertising exchange 110. The advertising network 116 can receive impression level data and preference data indicating that the user system 102 is located in Chicago, Ill., and expandable advertisements are excluded. The impression level data can also indicate keywords of "auto" and "hybrid" associated with the impression. In this example, the advertising network 116 can identify a car dealership in the Chicago area that carries hybrid vehicles and is associated with non-expandable advertisements as being a best match for the criteria received from the advertising exchange 110. The advertising network 116 can then calculate an actual static bid based on the criteria, and submit actual bid data representative of the actual static bid to the advertising exchange 110 to replace candidate bid data representative of the network proxy bid previously submitted.

In another example, the advertising network 116 can submit a network proxy bid associated with an advertising campaign for a plurality of national restaurant chains to the advertising exchange 110. A call back received from the advertising exchange 110 can indicate that the user system 102 is located in Atlanta, Ga. The advertising network 116 can identify that the current time in Atlanta is 11:00 pm. The advertising network 116 can identify a late night diner with locations in the Atlanta area as a best match for the criteria received from the advertising exchange 110. The advertising network 116 can then calculate an actual static bid based on the criteria, and submit the actual static bid to the advertising exchange 110 to replace the network proxy bid previously submitted.

In some implementations, the advertising network 116 can conduct an internal auction among several advertisers associated with an advertising campaign. The advertising network 116 can select an advertiser associated with a highest bid in the internal auction and submit the bid associated with selected advertiser to the advertising exchange 110 as the actual static bid. In some implementations, the advertising network 116 can calculate a bid for each advertiser associated with an advertising campaign based on criteria received from the advertising exchange 110. The advertising network 116 can select an advertiser associated with the highest calculated bid and submit the bid associated with selected advertiser to the advertising exchange 110 as the actual static bid to replace the network proxy bid previously submitted.

In some implementations, upon receiving an actual static bid to replace a network proxy bid for an impression from the advertising network 116, the advertising exchange can conduct an action by comparing the actual static bid with one or more other candidate bids to select a winning bid. The one or more other candidate bids can be static bids associated with the impression and actual static bids submitted by other advertising networks that had previously submitted network proxy bids associated with the impression. If the actual static bid submitted by the advertising network 116 is selected as a winning bid, the advertising exchange 110 can provide a network tag that indicates the advertising network 116 to the user system 102. The user system 102 can make a call to the advertising network 116 as indicated by the network tag. The advertising network 116 can access an advertisement database 118 to retrieve an advertisement. The advertising network 116 can deliver the advertisement to the user system 102. The browser 104 can display the advertisement received from the advertising network 116 on the webpage received from the publisher network 106.

For example, based on a network proxy bid previously submitted by the advertising network 116, the advertising exchange 110 can make a call back to the advertising network 116 to request an actual static bid for an impression associated with a fishing webpage. The advertising network 116 can identify a fishing boat dealer as a best match for the impression and submit an actual static bid for the impression to the advertising exchange 110 to replace the network proxy bid. The advertising exchange 110 can compare the actual static bid to one or more other candidate bids and select the actual static bid as the highest bid. The advertising exchange 110 can then send a network tag that indicates the advertising network 116 to the user system 102. The user system 102 can make a direct call to the advertising network 116 as indicated by the network tag. The advertising network 116 can retrieve an advertisement associated with the previously identified fishing boat dealer from the advertisement database 118. The advertising network can deliver the advertisement to the user network and the browser 104 can present the advertisement to a user as part of a webpage.

In some implementations, the advertising network 116 can submit an advertisement to the advertising exchange 110 along with an actual static bid. If the actual static bid submitted by the advertising exchange 110 is selected as a winning bid, the advertising exchange 110 can send the advertisement directly to the user system 102. For example, the advertising exchange 110 can make a call back to the advertising network 116 in relation to an impression associated with golfing. The advertising network 116 can identify a golf ball manufacturer as a best match for the impression. The advertising network 116 can calculate an actual static bid and submit the actual static bid along with an advertisement for the golf ball manufacturer to the advertising exchange 110. If the actual static bid submitted by the advertising network 116 is selected as a winning bid, the advertising exchange 110 can provide the advertisement for the golf ball manufacturer to the user system 102. The browser 104 can present the advertisement to a user as part of a webpage.

Bid Value Adjustment Based On Revenue Sharing

In some implementations, the advertising exchange 110 can use revenue sharing information or contractual information to adjust the value of one or more of the candidate bids, including the actual static bid submitted by the advertising network 116. For example, the advertising exchange 110 may have a contractual arrangement with the advertising network 116 in which the advertising exchange 110 has agreed to share 10% of the value of a winning bid with the advertising network 116 should a bid submitted by the advertising network 116 be selected as a winning bid. Additionally, the advertising exchange 110 may have a contractual arrangement with a second advertising network in which the advertising exchange 110 has agreed to share 20% of the value of a winning bid with the second advertising network should a bid submitted by the second advertising network be selected as a winning bid. If both the advertising network 116 and the second advertising network submit bids of $2.00, the advertising exchange 110 can subtract the amount of the bid that is to be shared with the respective advertising networks from the submitted bids to obtain adjusted values for the bids. In this example, the adjusted values would be $1.80 for the bid submitted by the advertising network 116 and $1.60 for the bid submitted by the second advertising network. Since the adjusted value of the bid submitted by the advertising network 116 is higher than the adjusted value of the bid submitted by the second advertising network, the bid submitted by the advertising network 116 can be selected as a winning bid. This process of adjusting bid values can allow the advertising exchange 110 to select a winning bid from the candidate bids based on the amount of revenue that the advertising exchange 110 will make from each bid rather than the initial value of the candidate bids.

Application Engine

The process of making a call back to an advertising network and waiting for an actual static bid can add extra latency to an impression bidding process. In some implementations, before making a call back to the advertising network 116, the advertising exchange 110 can make a call to an application engine 120. In some implementations, the application engine 120 can be located in the data center 112 so that the latency added by making a call to the application engine is negligible. In some implementations, the application engine 120 can have access to its own data storage.

The application engine 120 can analyze impression level data and preference data associated with an impression to determine if the impression may be of interest to the advertising network 116. The application engine 120 can access data about the advertising network 116 and advertising campaigns similar to an advertising campaign associated with a network proxy bid submitted by the advertising network 116 that is associated with the current impression. The application engine 120 can use this data to determine a level of interest in the current impression. If the application engine 120 indicates that the advertising network 116 is not likely to submit a competitive bid for the impression, the advertising exchange 110 can elect to not make a call back to the advertising network 116. This allows the advertising exchange 110 to avoid adding extra latency associated with a call back to an impression bidding process. If the application engine 120 indicates that the advertising network 116 is likely to submit a competitive bid for the impression, the advertising exchange 110 can make a call back to the advertising network 116 and wait for the advertising network to submit an actual static bid to replace the network proxy bid in an advertisement auction.

In some implementations, the advertising network 116 can submit program code to the application engine 120. For example, the advertising network 116 can submit a segment of Python code to be executed by the application engine 120. When the advertising exchange 110 makes a call to the application engine 120, the application engine 120 can execute the program code provided by the advertising network 116 to determine if the impression may be of interest to the advertising network 116. In some implementations, the application engine 120 can receive information associated with an impression from the advertising exchange 110. The program code provided by the advertising network 116 can use some or all of the information provided by the advertising exchange 110 to determine if the impression may be of interest to the advertising network 116.

Weak Bids

In some implementations, when the advertising network 116 submits a network proxy bid to the advertising exchange 110, the advertising network 116 can submit a maximum bid along with the request for call back. The maximum bid can be a maximum value that the advertising network 116 is willing to bid for an impression that relates to the network proxy bid. The advertising network 116 can associate different maximum bids with different target criteria. For example, a maximum bid associated with an advertising campaign for car dealerships can be set at $5.00 for impressions associated with auto manufacturer websites. As another example, a maximum bid associated with the same advertising campaign can be set at $0.50 for websites that feature mainly user generated content.

In some implementations, the advertising exchange 110 can avoid making call backs to advertising networks that have submitted maximum bids below a certain threshold. In some implementations, the advertising exchange 110 may only make call backs to advertising networks that have submitted maximum bids that are greater than a highest static bid that is relevant to an impression. For example, a number of static bids and network proxy bids can be identified as candidate bids for an impression. The advertising exchange 110 can determine that the greatest identified static bid is $1.00. The advertising exchange 110 can exclude advertising networks that have submitted maximum bids that are less than $1.00 from receiving a call back and only make call backs to advertising networks that have submitted maximum bids that are equal to or greater than $1.00. By excluding advertising networks with weak maximum bids from receiving call backs, the advertising exchange 110 can conserve network resources and avoid adding extra latency to an impression bidding process.

In some implementations, advertising networks, such as the advertising network 116, can submit program code for calculating a maximum bid to the application engine 120. For example, the advertising network 116 can submit a segment of Python code to be executed by the application engine 120. The advertising exchange 110 can make a call to the application engine 120 to calculate a maximum bid for an impression for the advertising network 116. The application engine 120 can execute the program code provided by the advertising network 116 to calculate a maximum bid for the advertising network 116. In some implementations, the application engine 120 can receive criteria associated with an impression from the advertising exchange 110. The program code provided by the advertising network 116 can use some or all of the criteria provided by the advertising exchange 110 to calculate a maximum bid. For example, the application engine can calculate a maximum bid of $1.00 if the current time is between 1:00 pm and 2:00 pm at the user system 102's geographic location and a maximum bid of $2.00 if the current time is between 2:00 pm and 3:00 pm at the user system 102's geographic location.

Fee Charging

In some implementations, the advertising exchange 110 may charge an advertising network a variable or fixed fee for receiving a call back. The fee, in some implementations, may be charged against the advertising network regardless of whether an actual static bid submitted by the advertising network is selected as a winning bid. Because an advertising network may submit a fraudulent maximum bid in an attempt to qualify for receiving a call back (e.g., where the actual maximum bid that the advertising network has intended to submit is lower than the fraudulent maximum bid), the charging of a fee may ensure that advertising networks submit accurate maximum bids. In these implementations, if a fee is charged for each call back from the advertising exchange 110, an advertising network has a greater incentive to submit an accurate maximum bid that better reflects actual static bids that will be calculated and submitted by the advertising network.

For example, the advertising network 116 may submit a maximum bid of $5 to the advertising exchange 110 even though the advertising network 116 is likely to submit actual static bids no greater than a bid of $1.20. In this example, the advertising network 116 may submit a fraudulent maximum bid so as to receive a greater number of call backs. If the advertising exchange 110 charges a fee (e.g., variable or fixed) for every call back, the advertising network 116 has an additional incentive to submit an accurate maximum bid (e.g., a bid of $1.20). By submitting an accurate maximum bid, the advertising network 116 can reduce the number of call backs it will receive, and reduce the number of fees it is charged for receiving call backs. By charging a fee for every call back, the advertising exchange 110 can encourage advertising networks to submit accurate maximum bids. This can reduce the number of call backs that are sent to advertising networks that are unlikely to submit competitive actual static bids. This can conserve network resources and reduce the amount of latency added to an impression bidding process.

Bid Caching

In some implementations, the advertising exchange 110 can include a cache 124. The cache 124 can store historical bidding data for the advertising network 116 and other advertising networks. For example, the cache 124 can store information about past actual static bids submitted by the advertising network 116. This information can include values of the bids, targeting criteria associated with the bids, and whether or not the bids submitted were chosen as winning bids. The advertising exchange 110 can use the historical bidding data to identify one or more categories of impressions for which the advertising network 116 rarely wins the bidding. In some implementations, when bidding occurs for an impression that matches one of the identified categories, the advertising exchange 110 can elect to not make a call back to the advertising network 116 since the advertising network 116 has historically submitted non-competitive bids for similar impressions. For example, historical bidding data stored in the cache 124 can indicate that the advertising network 116 rarely wins the bidding for impressions associated with rock climbing. When the advertising exchange 110 holds an auction for an impression associated with a rock climbing webpage, the advertising exchange 110 can elect to not send a call back to the advertising network 116. This can conserve network resources and reduce the amount of latency added to an impression bidding process.

In some implementations, the advertising exchange 110 can reduce the frequency of call backs to the advertising network 116 for impressions associated with a category for which the advertising network 116 has historically submitted non-competitive bids. For example, the advertising exchange 110 can identify a category of impressions for which the advertising network 116 has rarely submitted a winning actual static bid. The advertising exchange 110 can make a call back to the advertising network 116 for every tenth auction for impressions that fall into the identified category. This allows the advertising exchange 110 to conserve network resources and reduce latency by reducing the number of call backs made while still allowing the advertising network 116 to submit actual static bids for some impressions that fall into the identified category. In some implementations, if the advertising network 116 begins to submit winning actual static bids at a greater frequency, the advertising exchange 110 can increase the frequency of call backs made to the advertising network 116 for impressions that fall into the identified category.

Time Limit

In some implementations, when the advertising exchange 110 makes a call back to the advertising network 116, the advertising exchange 110 can set a time limit for receiving a response from the advertising network 116. If the advertising network 116 does not submit an actual static bid within the specified time limit, the advertising exchange 110 can identify the advertising network 116 as non-responsive and proceed with an impressing bidding process without receiving an actual static bid from the advertising network 116. This can reduce latency of an impression bidding process. In some implementations, the advertising exchange 110 can indicate the time limit to the advertising network 116 as part of a call back. For example, the advertising exchange 110 can set a time limit of 200 milliseconds for an auction. The advertising exchange 110 can make a call back to the advertising network 116 and indicate the time limit of 200 milliseconds to the advertising network 116 as part of the call back. If the advertising network 116 does not submit an actual static bid within 200 milliseconds, the advertising exchange can continue with the auction without receiving an actual static bid from the advertising network 116 to replace a network proxy bid.

Bid Macros

In some implementations, instead of registering a request for a call back when the advertising network 116 submits a network proxy bid, the advertising network 116 can submit a bid macro for calculating an actual static bid. In some implementations, the bid macro can be program code (e.g., Python code) for implementing a formula to compute an actual static bid. The bid macro can use impression level data and preference data associated with an impression to calculate an actual static bid. For example, the advertising network 116 can submit a bid macro along with a network proxy bid to the advertising exchange 110. The advertising exchange 110 can identify targeting criteria associated with the network proxy bid as relating to an impression. The advertising exchange 110 can execute the bid macro to calculate an actual static bid for the advertising network 116. The bid macro can receive impression level data and preference data from the advertising exchange 110 to use in calculating an actual static bid. The actual static bid calculated by the bid macro can be used to replace the network proxy bid. The advertising exchange 110 can compare the actual static bid calculated by the bid macro to other candidate bids and select a winning bid. By avoiding making a call back to the advertising network 116 to receive an actual static bid, network resources can be conserved and the amount of latency added to an impression bidding process can be reduced.

In some implementations, the advertising network 116 can submit one or more bid macros associated with one or more network proxy bids to the application engine 120. For example, the advertising network 116 can submit Python code for calculating an actual static bid to the application engine 120. When the advertising exchange 110 identifies targeting criteria associated with a network proxy bid submitted by the advertising network 116 as relating to an impression, the advertising exchange 110 can make a call to the application engine 120. The advertising exchange 110 can provide impression level data and preference data associated with the impression to the application engine 120. The application engine 120 can implement the bid macro and calculate an actual static bid for the advertising network 116. The application engine 120 can then submit the actual static bid to the advertising exchange 110 to replace the network proxy bid. If the actual static bid is selected as a winning bid, the advertising exchange 110 can send a network tag indicating the advertising network 116 to the user system 102. In some implementations, the application engine 120 can be included in the data center 112 with the advertising exchange 110 so that the time required to make a call to the application engine 120 and receive an actual static bid is significantly less than the time required to make a call back to the advertising network 116 and receive an actual static bid.

Cookies

In some implementations, when the user system 102 informs the advertising exchange 110 of an impression and sends a URL to the advertising exchange 110, the user system 102 can also send a cookie to the advertising exchange 110. The cookie can identify a user of the user system 102. In some implementations, the cookie can be encrypted. The advertising exchange 110 can decrypt the cookie and parse the cookie to identify a user key. In some implementations, the advertising exchange 110 can provide the cookie or a user key extracted from the cookie to the advertising network 116 as part of a call back. In some implementations, the advertising exchange 110 may have a different cookie space than the advertising network 116. In these implementations, the advertising exchange 110 can implement a match coding process to match a cookie from the advertising exchange 110 cookie space to a cookie from the advertising network 116 cookie space. In some implementations, the advertising exchange 110 can use a match table to implement the match coding process.

The advertising network 116 can use the cookie received from the advertising exchange 110 to identify an advertiser that is a best match for the impression and to calculate an actual static bid for the impression. For example, the advertising network 116 can receive a cookie along with a call back for an impression related to cars. The advertising network 116 can use the cookie to identify a user of the user system 102. The advertising network can determine that the user has visited a website owned and operated by Toyota and that the user has looked at a webpage for Toyota trucks on the website. If Toyota is associated with an advertising campaign run by the advertising network 116, the advertising network 116 can select Toyota as a best match for the impression. Since the user has previously shown interest in Toyota trucks, this may lead the advertising network 116 to calculate and submit a higher actual static bid than if the user had not previously demonstrated an interest in Toyota trucks.

The advertising network 116 can submit the actual static bid to the advertising exchange 110 to replace a network proxy bid. If the actual static bid is selected as a winning bid, the advertising exchange can send a network tag for the advertising network 116 to the user system 102. The user system 102 can request an advertisement from the advertising network 116. In some implementations, the user system 102 can send cookie data to the advertising network 116 along with the request for an advertisement. The advertising network 116 can use the cookie data to identify the user and to update information about the user in a cookie space or to populate a cookie mapping table. The advertising network 116 can select an advertisement related to Toyota trucks from the advertisement database 118 since the user has previously displayed an interest in Toyota trucks. The advertising network 116 can send the advertisement to the user system 102 and the browser 104 can present the advertisement to the user.

In another example similar to the above example, the user may have previously visited the Toyota website and viewed a page for hybrid cars. In this example, the advertising network 116 can select an advertisement for Toyota hybrid vehicles from the advertising database 118 and provide the advertisement to the user system 102.

In some implementations, the advertising network 116 can submit an advertisement to the advertising exchange 110 along with an actual static bid. The advertising network 116 can include an extra pixel, or beacon pixel, along with the advertisement. For example, if the advertisement is a .GIF file, the advertising network 116 can add a beacon pixel to the .GIF file. In some implementations, the beacon pixel can include a cookie request. If the actual static bid submitted by the advertising exchange 110 is selected as a winning bid, the advertising exchange 110 can send the advertisement that includes the beacon pixel directly to the user system 102. The browser 104 can present the advertisement to the user of the user system 102. Asynchronously with the presentation of the advertisement, the browser 104 can implement a request included in the beacon pixel and send cookie data to the advertising network 116. The advertising network 116 can use the cookie data to identify the user and to update information about the user in a cookie space or to populate a cookie mapping table.

Exchange-to-Exchange Proxy Bidding

Figure 1B:
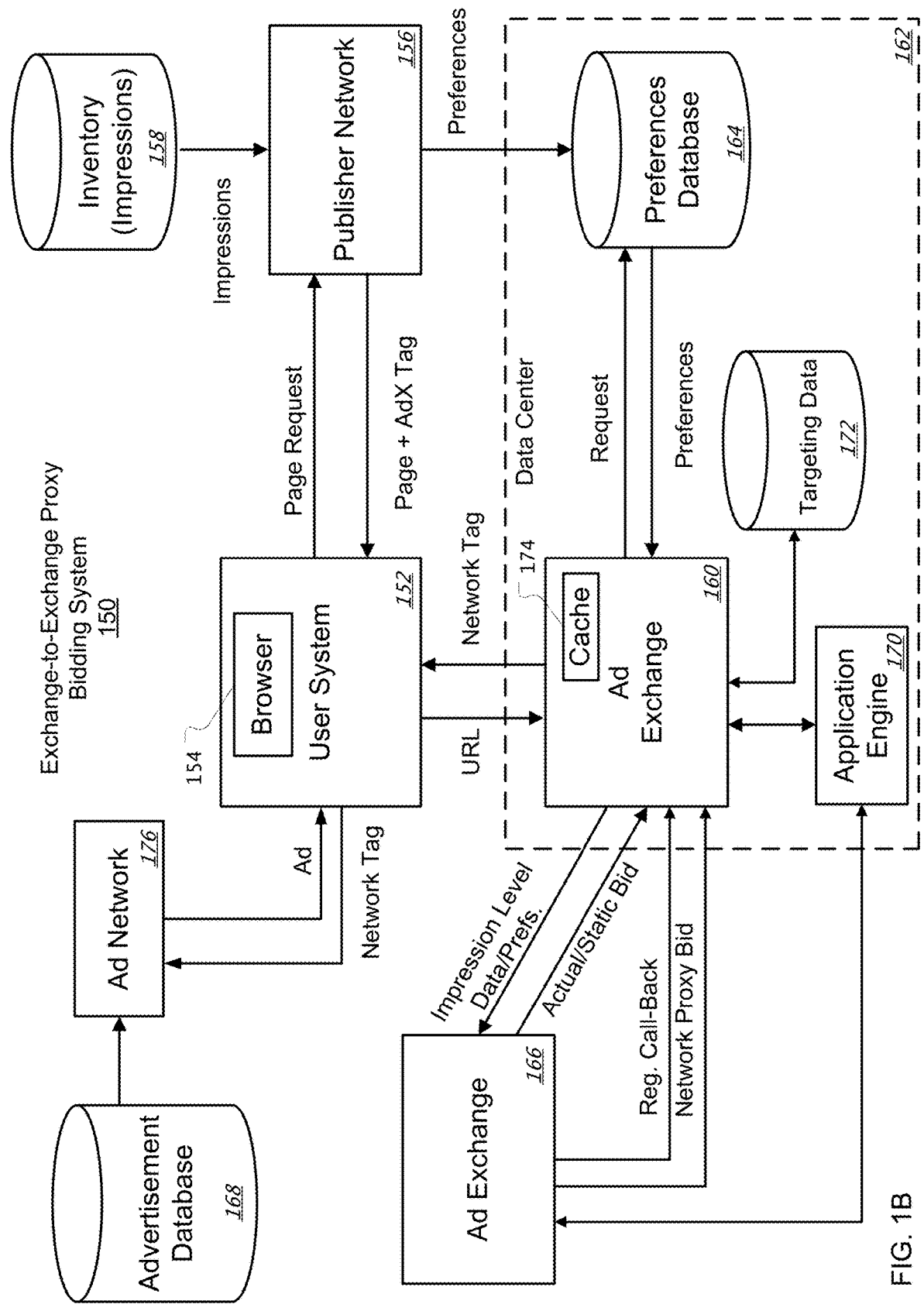
FIG. 1B shows an example exchange-to-exchange proxy bidding system.

FIG. 1B shows an example exchange-to-exchange proxy bidding system 150 for submitting and receiving proxy advertising bids between advertising exchanges. The system 150 includes a user system 152 (e.g., a computer or mobile device) that includes a browser 154. The browser 154 can request a webpage from a publisher network 156. The publisher network 156 can receive a webpage request from the user system 152 and access an inventory database 158 to retrieve an advertising impression. The publisher network 156 can provide the requested webpage to the user system 152 along with the advertising impression. The webpage can include an advertising exchange tag identifying a first advertising exchange 160. The user system 102 can contact the first advertising exchange 160 to request an advertisement and provide impression level data relating to the impression, such as for example, a URL of the webpage.

The first advertising exchange 160 can be located within a data center 162. The first advertising exchange 160 can access a preferences database 164 located within the data center 162 and can retrieve preference data associated with the impression, such as advertiser exclusion preferences and creative restrictions, from the preferences database 164. In some implementations, the first advertising exchange 160 can access a targeting data database 172 to request contextual information and targeting information associated with the URL and can use the retrieved preference data and targeting information in an advertising auction to identify candidate bids for the impression. For example, the first advertising exchange 160 can identify a number of static bids submitted by advertisers as relating to the preference data and targeting information associated with the impression. These static bids can be identified as candidate bids for the impression.

In some implementations, a second advertising exchange 166 can place a bid for an impression in an advertising auction being held by the first advertising exchange 160. The second advertising exchange 166 may place a bid so that an advertiser or advertising network associated with the second advertising exchange 166 has an opportunity to purchase the impression. This allows advertising exchanges to exchange impression inventory and allows an advertiser or advertising network associated with one exchange to bid on impressions associated with a different exchange. In some implementations, the second advertising exchange 166 can submit a proxy bid to the first advertising exchange 160. A proxy bid can be used to indicate to the first advertising exchange 160 that the second advertising exchange 166 has registered a call back with the first advertising exchange 160. A proxy bid can be associated with targeting criteria as described above for static bids.

In some implementations, the first advertising exchange 160 can identify a proxy bid submitted by the second advertising exchange 166 as a candidate bid for an impression based on targeting criteria associated with the proxy bid. In some implementations, the second advertising exchange 166 can indicate that the bid is for all available impressions by submitting a proxy bid with no associated targeting criteria. The proxy bid can thus be identified as a candidate bid for all advertising auctions.

When a proxy bid has been identified as a candidate bid, the first advertising exchange 160 can make a call back to the second advertising exchange 166 to request an actual static bid to replace the proxy bid. The call back can include preference data and impression level data associated with the impression. The preference data can include advertiser exclusion preferences and creative restrictions received from the preferences database 164. The impression level data can include information such as a URL associated with the impression, an IP address of the user system 152, a geographic location of the user system 152, keyword information associated with the impression, contextual information associated with the impression, and browser parameters of the browser 154. The impression level data and preference data can be used by the second advertising exchange 166 to calculate an actual static bid to submit in place of the proxy bid. In some implementations, the first advertising exchange 160 can make call backs to other advertising exchanges even if the other advertising exchanges have not submitted proxy bids. For example, the first advertising exchange 160 can make a call back to the second advertising exchange 166 to see if the second advertising exchange 166 will submit an actual static bid for a particular impression even if the second advertising exchange 166 has not previously submitted a proxy bid to the first advertising exchange 160. This will allow the first advertising exchange 160 to secure the highest available bid for its inventory.

In some implementations, the second advertising exchange 166 can indicate to the first advertising exchange 160 that it will not receive call backs for some or all types of inventory. Accordingly, call backs will not be sent to the second advertising exchange 166 (or may be ignored by the second advertising exchange 166).

In some implementations, the first advertising exchange 160 can transmit information specifying an auction type (e.g., first price auction, second price auction, etc.) for an advertising auction the second advertising exchange 166 along with a request for an actual static bid and impression level data. This information can be used by the second advertising exchange 166 to calculate an actual static bid. For example, when the first advertising exchange 160 provides impression data to the second advertising exchange 166, the impression data may include information specifying that the auction is a first price auction. If the second advertising exchange 166 is also a first price market (i.e., conducts first price auctions), the second advertising exchange 166 can hold an internal auction to identify a high bid and submit the value of the high bid as an actual static bid for the auction being held by the advertising exchange 160. In some implementations, the second advertising exchange 166 can calculate an estimated highest bid and submit the estimated high bid as an actual static bid.

As another example, the first advertising exchange 160 can indicate to the second advertising exchange 166 that the auction is a second price auction. If the second advertising exchange 166 is a first price market (i.e., conducts first price auctions), the second advertising exchange 166 can hold its own auction to identify a high bid and submit the value of the high bid as an actual static bid for the auction being held by the advertising exchange 160. If the actual static bid submitted by the second advertising exchange 166 is identified as the highest bid, the second advertising exchange 166 can purchase the impression and pay the value of the second highest bid to the first advertising exchange 160. The second advertising exchange 166 can then sell the impression to an advertiser or advertising network associated with the high bid and the advertiser or advertising network pays the value of the high bid. The second advertising exchange 166 can thus profit by keeping the difference between the values of the high bid and the second highest bid.

In some implementations, the second advertising exchange 166 can use the auction type information received from the first advertising exchange 160 to perform an auction bid translation when determining and submitting an actual static bid. For example, if the first advertising exchange 160 and the second advertising exchange 166 conduct advertisement auctions of different types of auctions, the second advertising exchange 166 may need to perform an auction bid translation on a bid before submitting an actual static bid to the first advertising exchange 160.

For example, in some cases, an advertising exchange can translate bids such that the exchange can generate revenue when the exchange submits a winning bid. Assume the first advertising exchange 160 can be a first price market (i.e., conducts first price auctions) and the second advertising exchange 166 can be a second price market (i.e., conducts second price auctions). The second advertising exchange 166 can hold its own auction to identify a high bid and a second highest bid. The second advertising exchange 166 can submit a value that is a set amount less than the identified second highest bid as an actual static bid. If the actual static bid submitted by the second advertising exchange 166 is identified as the highest bid, the second advertising exchange 166 can purchase the impression and pay the value of the actual static bid to the first advertising exchange 160. The second advertising exchange 166 can then sell the impression to an advertiser or advertising network associated with the high bid and the advertiser or advertising network pays the value of the second highest bid. In this implementation, the second advertising exchange 166 can profit by keeping the difference between the values of the second highest bid and the submitted actual static bid. This implementation can reduce the probability that the actual static bid submitted by the second advertising exchange 166 is selected as a winning bid, but can provide a profit for the second advertising exchange 166.

In some implementations, the second advertising exchange 166 can calculate an optimal value for the actual static bid that is less than the identified second highest bid. For example, the identified second highest bid can be a value Y, and the actual static bid submitted can be Z. The optimal value of Z can be determined by finding the value of Z that maximizes the value of the probability of Z being selected as a winning bid multiplied by Y minus Z (i.e., prob[winning at price Z]*(Y−Z)). In some cases, this probability may be determined by reviewing historical transaction data to determine how likely a particular value for Z is to result in a winning bid. In some implementations, the value of Z with the highest likelihood of resulting in a winning bid can be selected. In other implementations, any value of Z with a likelihood of resulting in a winning bid that exceeds a minimum threshold can be selected.

In some implementations, an exchange can translate bids such that the exchange may increase its chances of winning an auction while not having to subsidize the transaction. For instance, the first advertising exchange 160 can indicate to the second advertising exchange 166 that the auction is a first price auction. If the second advertising exchange 166 is a second price market (i.e., conducts second price auctions), the second advertising exchange 166 can hold its own auction to identify a high bid and a second highest bid. In some implementations, the second advertising exchange 166 can submit the value of the second highest bid as an actual static bid. If the actual static bid submitted by the second advertising exchange 166 is identified as the highest bid, the second advertising exchange 166 can purchase the impression and pay the value of the actual static bid (i.e., the second highest bid from the first auction) to the first advertising exchange 160. The second advertising exchange 166 can then sell the impression to an advertiser or advertising network associated with the high bid and the advertiser or advertising network pays the value of the second highest bid. In this implementation, the second advertising exchange 166 can avoid paying a network the difference between the highest bid and the second highest bid because it sells the impression to the advertiser or advertising network for the same value that it paid to the first advertising exchange 160.

As another example, assume both the first advertising exchange 160 and the second advertising exchange 166 are second place markets (i.e., conduct second price auctions), and the second advertising exchange 166 holds an auction and identifies a high bid of $2.50 and a second highest bid of $2.25. The second advertising exchange 166 can submit the second highest bid of $2.25 as an actual static bid. If the actual static bid submitted by the second advertising exchange 166 is identified as the highest bid and a second highest bid in the second auction has a value of $2.00, the second advertising exchange 166 can purchase the impression from first advertising exchange 160 for $2.00 (i.e., the second highest bid in the second auction). The second advertising exchange 166 can then sell the impression to an advertiser or advertising network associated with the high bid for $2.25 (i.e., the second highest bid in the first auction). In this example, the second advertising exchange 166 makes a profit of $0.25 by keeping the difference.

In some implementations, the second advertising exchange 166 can submit a network tag along with an actual static bid. The network tag can identify an advertiser or advertising network associated with a high bid identified in an auction held by the second advertising exchange 166. For example, the network tag can identify an advertising network 176 as being associated with the high bid. If the actual static bid submitted by the second advertising exchange 166 is selected as a winning bid by the first advertising exchange 160, the first advertising exchange 160 can provide the network tag to the user system 152. The user system 152 can make a call to the advertising network 176 as indicated by the network tag. The advertising network 176 can access an advertisement database 168 to retrieve an advertisement. The advertising network 176 can deliver the advertisement to the user system 152, and the browser 154 can display the advertisement received from the advertising network 176 on the webpage received from the publisher network 156.

In some implementations, the first advertising exchange 160 can make a call to an application engine 170. The application engine 170 can determine if the second advertising exchange 166 is likely to submit a competitive bid for an impression as described above for network proxy bidding. If the application engine 170 indicates that the second advertising exchange 166 is not likely to submit a competitive bid for the impression, the first advertising exchange 160 can elect to not make a call back to the second advertising exchange 166.

In some implementations, the application engine can determine if the second advertising exchange is likely to submit a competitive bid for an impression using historical bidding data. For instance, the first advertising exchange 160 can include a cache 174. The cache 174 can store historical bidding data for the second advertising exchange 166 and other advertising exchanges. For example, the cache 174 can store information about past actual static bids submitted by the second advertising exchange 166. This information can include values of the bids, targeting criteria associated with the bids, and whether or not the bids submitted were chosen as winning bids. The historical bidding data can be used to identify one or more categories of impressions for which the second advertising exchange 166 rarely wins the bidding as described above for network proxy bidding. When the first advertising exchange 160 holds an auction for an impression associated with an impression category for which the second advertising exchange 166 has rarely offered a winning bid (e.g., the second advertising exchange 166 has offered a winning bid less than 10% of the time), the first advertising exchange 160 can elect to not send a call back to the second advertising exchange 166.

In some implementations, when the first advertising exchange 160 makes a call back to the second advertising exchange 166, the first advertising exchange 160 can set a time limit for receiving a response from the second advertising exchange 166 as described above for network proxy bidding. For example, the first advertising exchange 160 can specify a time limit of 250 milliseconds. If the second advertising exchange 166 does not submit an actual static bid within the specified time limit, the first advertising exchange 160 can identify the second advertising exchange 166 as non-responsive and proceed with an impressing bidding process without receiving an actual static bid from the second advertising exchange 166.

Exemplary Processes

Figure 2:
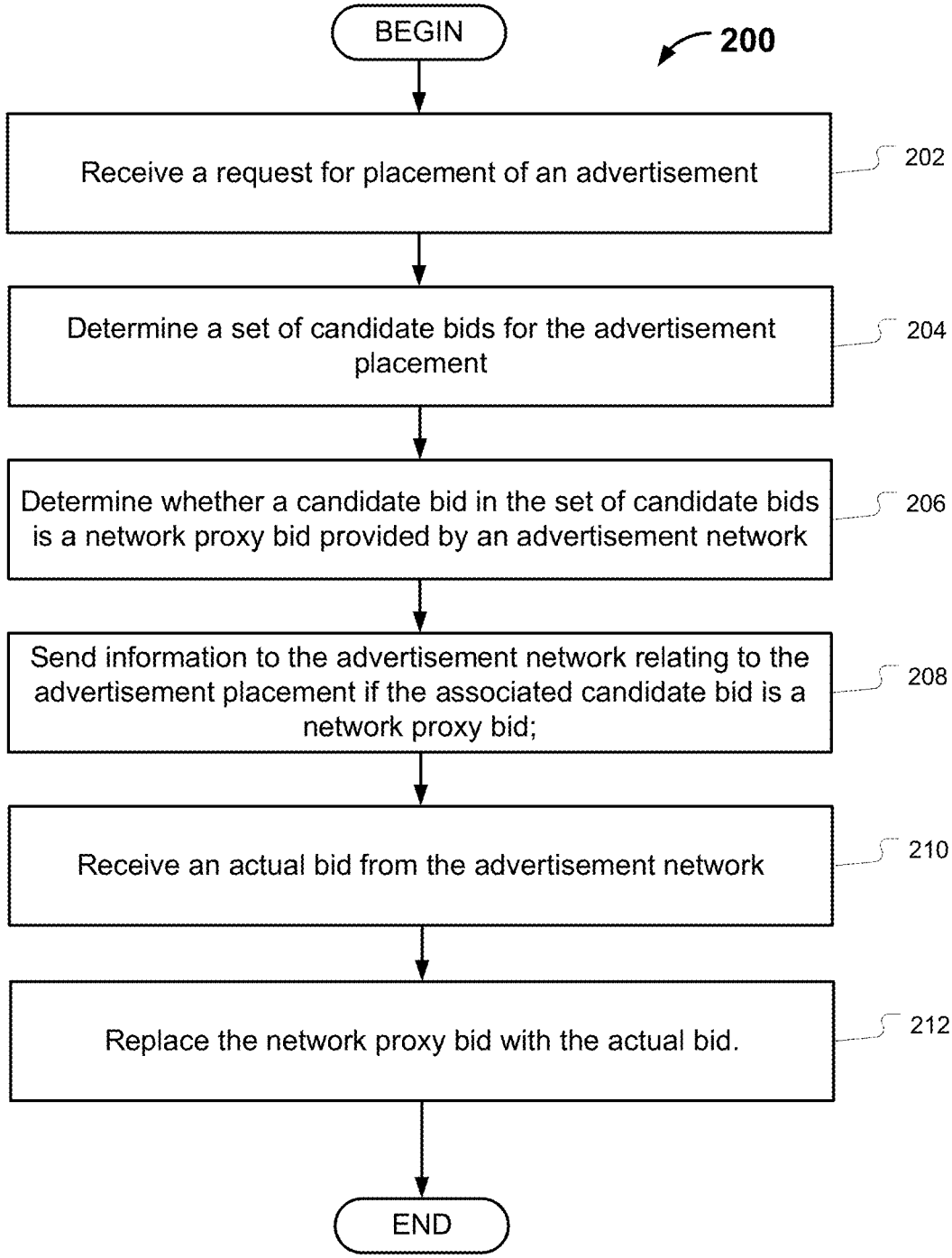
FIG. 2 is a flow diagram showing an example process for identifying a network proxy bid and receiving an actual bid.

FIG. 2 is a flow diagram showing an example process 200 for identifying a network proxy bid and receiving an actual bid. The process 200 may be performed, for example, by the system 100, and for clarity of presentation, the description that follows uses this as the basis of examples for describing the process 200. However, another system, or combination of systems, may be used to perform the process 200.

Process 200 begins with receiving a request for placement of an advertisement with published content provided by a publisher network (202). For example, referring to FIG. 1A, the advertising exchange 110 can receive a request for placement of an advertisement from the user system 102. The user system 102 can indicate that an impression associated with published content provided by the publisher network 106 is available.

In some implementations, additional data associated with the request for placement of an advertisement can be received. The data received can include an IP address, a URL, geographic location information, cookie data, contextual information, user browser data, preference data, or presentation information associated with an advertisement. For example, referring to FIG. 1A, the advertising exchange 110 can receive a URL associated with an advertisement placement from the user system 102. As another example, the advertising exchange 110 can receive advertiser exclusion preference data and creative restriction data associated with an advertisement placement from the preferences database 114. As another example, the advertising exchange 110 can receive contextual information from the targeting data database 122.

A set of candidate bids for the advertisement placement can be determined (204). For example, referring to FIG. 1A, the advertising exchange 110 can identify a number of candidate bids associated with targeting criteria that relate to data associated with the advertisement placement. For example, a bid can be associated with targeting criteria for golf related webpages. An advertisement placement can be associated with contextual information indicating that published content associated with the advertisement placement takes the form of a golf related webpage. The bid can be identified as a candidate bid that is relevant to the advertisement placement.

It can be determined whether a candidate bid in the set of candidate bids is a network proxy bid provided by an advertisement network (206). For example, referring to FIG. 1A, the advertising exchange 110 can identify a candidate bid as a network proxy bid registered by the advertising network 116. A network proxy bid can indicate to an advertising exchange that an advertising network wishes to receive a call back for advertisement placements related to the network proxy bid so that the advertising network can calculate an actual bid to submit in an advertisement auction in place of the network proxy bid. In some implementations, an advertising network can submit a network proxy bid to an advertising exchange in place of a static bid. The network proxy bid can be associated with targeting criteria. When the advertising exchange receives a request for placement of an advertisement, the advertising exchange can compare information associated with the advertisement placement with the targeting criteria. If the targeting criteria is determined to be relevant to the information associated with the advertisement placement, the network proxy bid can be identified as a candidate bid.

In some implementations, upon identifying a candidate bid as a network proxy bid, a maximum bid associated with the network proxy bid can be identified. The maximum bid can be analyzed to determine if the maximum bid satisfies a threshold. For example, referring to FIG. 1A, the advertising network 116 can submit a network proxy bid to the advertising exchange 110. The advertising network 116 can submit a maximum bid along with the network proxy bid. The advertising exchange 110 can compare the maximum bid to a threshold associated with an advertisement placement to determine if the maximum bid satisfies the threshold. If the maximum bid does not satisfy the threshold, the network proxy bid can be identified as a weak bid and removed from the set of candidate bids.

In some implementations, a threshold can be determined by selecting a highest bid from one or more static bids. A value associated with the highest bid can be set as the threshold. If a maximum bid associated with a network proxy bid is greater than the value, the maximum bid can be identified as satisfying the threshold. For example, three static bids can be identified as being related to an advertisement placement. The three static bids can be associated with values of $0.50, $0.75 and $1.00. The static bid associated with the value of $1.00 can be identified as the highest static bid and a threshold associated with the advertisement placement can be set at $1.00. If a maximum bid associated with a network proxy bid has a value greater than $1.00, the maximum bid can be identified has satisfying the threshold. If a maximum bid associated with a network proxy bid has a value less than or equal to $1.00, the network proxy bid can be identified as a weak bid and removed from the set of candidate bids. In some implementations, a maximum bid associated with a network proxy bid can be calculated by executing code submitted by an advertising network.

In some implementations, a request for placement of an advertisement can be analyzed to determine if an advertising network associated with an identified candidate network proxy bid is likely to submit a competitive actual bid. For example, referring to FIG. 1A, the advertising exchange 110 can make a call to the application engine 120. The application engine 120 can analyze impression level data and preference data associated with an advertisement placement to determine if the advertising network 116 is likely to submit a competitive actual bid for the advertisement placement. In some implementations, it can be determined if the advertising network is likely to submit a bid that is greater than a predetermined threshold. If the advertising network is likely to submit a bid that is greater than the predetermined threshold, then it can be determined that the advertising network is likely to submit a competitive bid. In some implementations, the application engine 120 can access data about the advertising network 116 and advertising campaigns similar to an advertising campaign associated with a network proxy bid submitted by the advertising network 116 that is associated with the current advertisement placement. The application engine 120 can use this data to determine if the advertising network 116 is likely to submit a competitive actual bid. If it is determined that an advertising network is not likely to submit a competitive actual bid, a network proxy bid associated with the advertising network can be removed from the set of candidate bids.

In some implementations, historic bidding data associated with an advertising network can be used to determine if the advertising network is likely to submit a competitive actual bid. In some implementations, a percentage of past actual bids submitted by an advertising network that were selected as winning bids for a particular category of advertisement placement can be compared to a threshold to determine if the advertising network is likely to submit a winning actual bid. For example, referring to FIG. 1A, the advertising exchange 110 can associate a threshold of 20% with a category of advertisement placements. The cache 124 can store information about past actual bids submitted by the advertising network 116. The advertising exchange 110 can determine a percentage of auctions for which the advertising network 116 has submitted a winning bid for a category of advertisement placements based on the historical bidding data. If the determined percentage is greater than 20%, it can be determined that the advertising network 116 is likely to submit a competitive bid for future advertisement placements that fall into the category. If the determined percentage is less than 20%, it can be determined that the advertising network 116 is not likely to submit a competitive bid for future advertisement placements that fall into the category. In some implementations, if it is determined that an advertising network is not likely to submit a competitive actual bid, a network proxy bid associated with the advertising network can be removed from the set of candidate bids.

If a candidate bid is identified as a network proxy bid, information relating to the advertisement placement can be sent to the advertisement network (208). For example, referring to FIG. 1A, the advertising exchange 110 can transmit impression level data and preference data to the advertising network 116. In some implementations, the data transmitted to the advertising network can be used to calculate an actual bid. In some implementations, the data transmission can be included as part of a call back requesting an actual bid from the advertising network. For example, referring to FIG. 1A, the advertising exchange 110 can make a call back to the advertising network 116 requesting an actual bid for an advertisement placement. In some implementations, information relating to the advertisement placement can be sent to the advertisement network only if the identified network proxy bid is not a weak bid.

In some implementations, the advertising network can be debited for receiving a call back. For example, referring to FIG. 1A, the advertising exchange 110 can charge a fee to the advertising network 116 when the advertising exchange 110 makes a call back to the advertising network 116. In some implementations, an advertising network can be debited for receiving a call back even if an actual bid submitted by the advertising network is not selected as a winning bid.

An actual bid from the advertisement network can be received (210). For example, referring to FIG. 1A, the advertising exchange 110 can receive an actual bid from the advertising network 116. In some implementations the actual bid can be computed based on the previously sent information. For example, referring to FIG. 1A, the advertising network 116 can receive information associated with an advertisement placement from the advertising exchange 110. The advertising network 116 can use some or all of the information to compute an actual bid. The advertising exchange 110 can then receive the actual bid from the advertising network 116 which can be used in a subsequent advertisement auction instead of the network proxy bid.

In some implementations, the process of receiving an actual bid can include receiving code associated with a network proxy bid and executing the code to obtain the actual bid. For example, an advertising exchange can receive program code (e.g., Python code) from an advertising network. The program code can be associated with a network proxy bid. If the network proxy bid is identified as a candidate bid for an advertisement placement, the program code can be executed to compute an actual bid. The actual bid can be used as part of an auction process for bidding on the advertisement placement. In some implementations, the code can use information associated with an advertisement placement when computing an actual bid. For example, the code can use contextual data, preference data, geographic location data, or cookie data when computing an actual bid.

The network proxy bid can be replaced with the actual bid in an advertisement auction (212). For example, referring to FIG. 1A, the advertising exchange 110 can replace a network proxy bid previously registered by the advertising network 116 that had been identified as a candidate bid with an actual bid received from the advertising network 116. In some implementations, an auction for the advertisement placement can be conducted using the actual bid. The actual bid can be compared to other candidate bids to determine a highest bid. An advertising network associated with the highest bid can be identified as having submitted a winning bid. For example, referring to FIG. 1A, the advertising exchange 110 can receive an actual bid for an advertisement placement from the advertising network 116. The advertising exchange 110 can compare the actual bid to other candidate bids, including static bids and actual bids received from other advertising networks. If the actual bid submitted by the advertising network 116 is the highest bid, the advertising network 116 can be identified as having submitted a winning bid.

In some implementations, a network tag associated with an advertising network identified as having submitted a winning bid can be provided to a user system. For example, referring to FIG. 1A, the advertising exchange 110 can identify the advertising network 116 as having submitted a winning bid. The advertising exchange 110 can then provide a network tag associated with the advertising network 116 to the user system 102. The user system 102 can contact the advertising network 116 to receive an advertisement associated with the winning bid. The advertising network 116 can then provide the advertisement to the user system 102. The user system 102 can present the advertisement to a user.

In some implementations, an advertisement associated with the winning bid can be selected for the advertisement placement. In some implementations, an advertising network can submit an advertisement to an advertising exchange along with an actual bid. If the actual bid is selected as a winning bid, the advertisement can be selected for the advertisement placement. In some implementations, the advertisement can be delivered to a user system. For example, referring to FIG. 1A, the advertising exchange 110 can provide an advertisement associated with a winning bid to the user system 102. The user system 102 can present the advertisement to a user.

Figure 3:
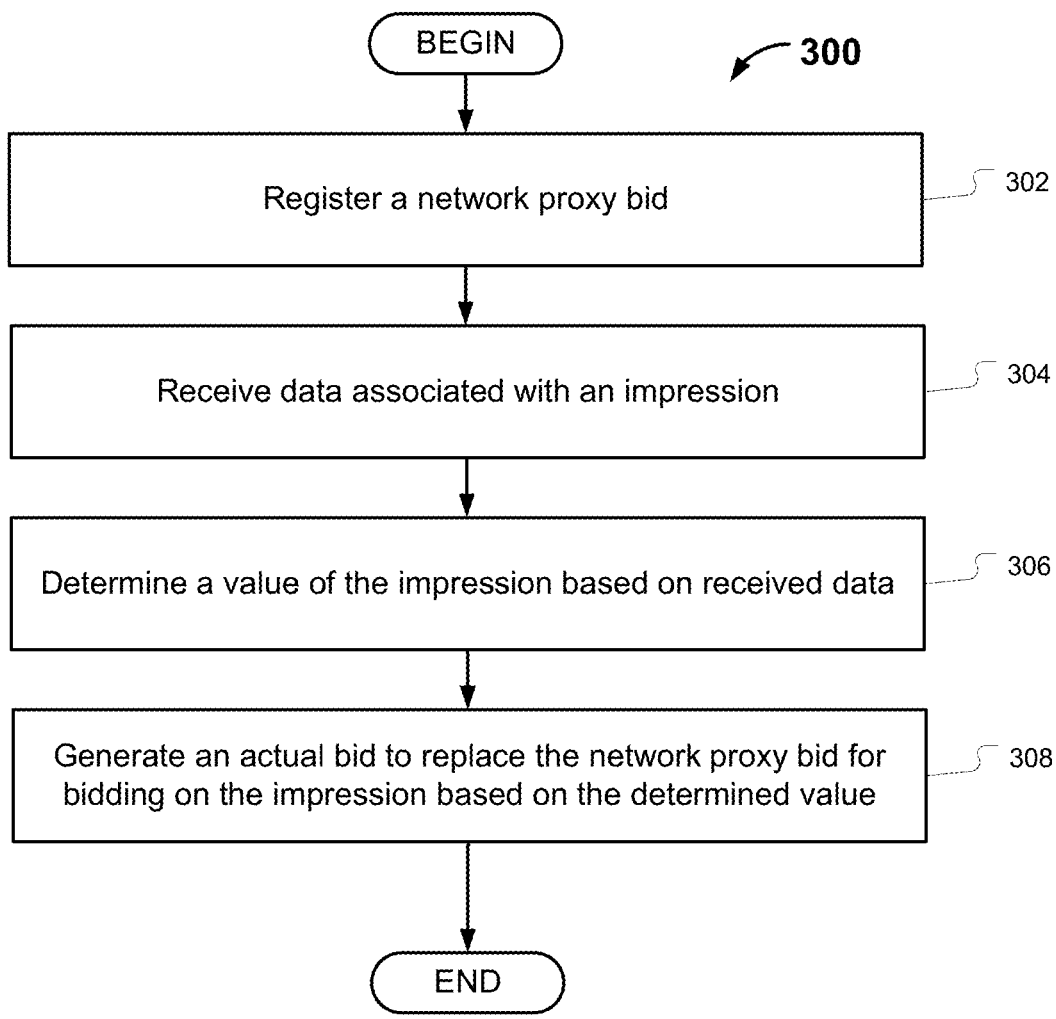
FIG. 3 is a flow diagram showing an example process for registering a network proxy bid.

FIG. 3 is a flow diagram showing an example process 300 for registering a network proxy bid. The process 300 may be performed, for example, by the system 100, and for clarity of presentation, the description that follows uses this as the basis of examples for describing the process 300. However, another system, or combination of systems, may be used to perform the process 300.

Process 300 begins with registering a network proxy bid (302). For example, referring to FIG. 1A, the advertising network 116 can register a network proxy bid with the advertising exchange 110. A network proxy bid can indicate that an advertising exchange wishes to receive a call back so that the advertising exchange can calculate and submit an actual bid. In some implementations, a network proxy bid can be associated with targeting criteria. For example, targeting criteria associated with a network proxy bid can indicate an interest in golf related webpages. As another example, targeting criteria associated with a network proxy bid can indicate an interest in impressions located at the top of a webpage. Targeting criteria can allow an advertising exchange to identify impressions that are relevant to a network proxy bid.

In some implementations, an advertising network can submit a maximum bid along with a network proxy bid. A maximum bid can be a maximum value that the advertising network is willing to pay for an impression related to the network proxy bid. In some implementations, an advertising network can submit program code associated with a network proxy bid for calculating one or more maximum bids to associate with the network proxy bid. In some implementations, an advertising network can submit program code associated with a network proxy bid for calculating an actual bid. The program code can be executed by an advertising exchange to calculate an actual bid in place of the network proxy bid for a given impression.

Data associated with an impression can be received (304). For example, referring to FIG. 1A, the advertising network 116 can receive impression level data and preference data associated with an impression from the advertising exchange 110. The data received can include an IP address, a URL, geographic location information, cookie data, contextual information, user browser data, preference data, or presentation information associated with an impression. In some implementations, the data received can be associated with an impression that matches one or more targeting criteria associated with the network proxy bid. In some implementations, a request to submit an actual bid can be included with the received data.

A value of the impression can be determined based on the received data (306). In some implementations, where an advertising network represents a group of advertisers, the advertising network can analyze each advertiser and associated advertising campaign to identify an advertiser that fits the one or more criteria of the impression. The advertising network can determine a value that the impression may be worth to the identified advertiser. In some implementations, the process of determining a value of an impression can include comparing the impression to one or more other existing impressions associated with an advertising campaign of the identified advertiser. For example, referring to FIG. 1A, the advertising network 116 can compare a current impression to a previous impression associated with an advertising campaign of the same advertiser. If the current impression is determined to be more relevant to an advertising campaign than the previous impression, the current impression can be given a higher value than the previous impression.

An actual bid can be generated to replace the network proxy bid based on the determined value (308). For example, referring to FIG. 1A, the advertising network 116 can generate an actual bid for an impression. In some implementations, some or all of the received data can be used to generate an actual bid for the impression. For example, an advertising network can receive data for an impression relating to an advertising campaign for surfboard and surfing equipment manufacturers. If geographic information included with the received data indicates that a user associated with the impression lives near an ocean, the advertising network may generate a higher actual bid than if the geographic information indicated that the user does not live near an ocean. In some implementations, the actual bid can be generated based on a determined value for an impression. In some implementations, a value for an impression determined by comparing the impression to one or more other impressions can be used to generate an actual bid for the impression. In some implementations, the generated actual bid can be submitted to replace a network proxy bid. For example, referring to FIG. 1A, the advertising network 116 can submit an actual bid to the advertising exchange 110 to take the place of a network proxy bid.

Generic Computer System

Figure 4:
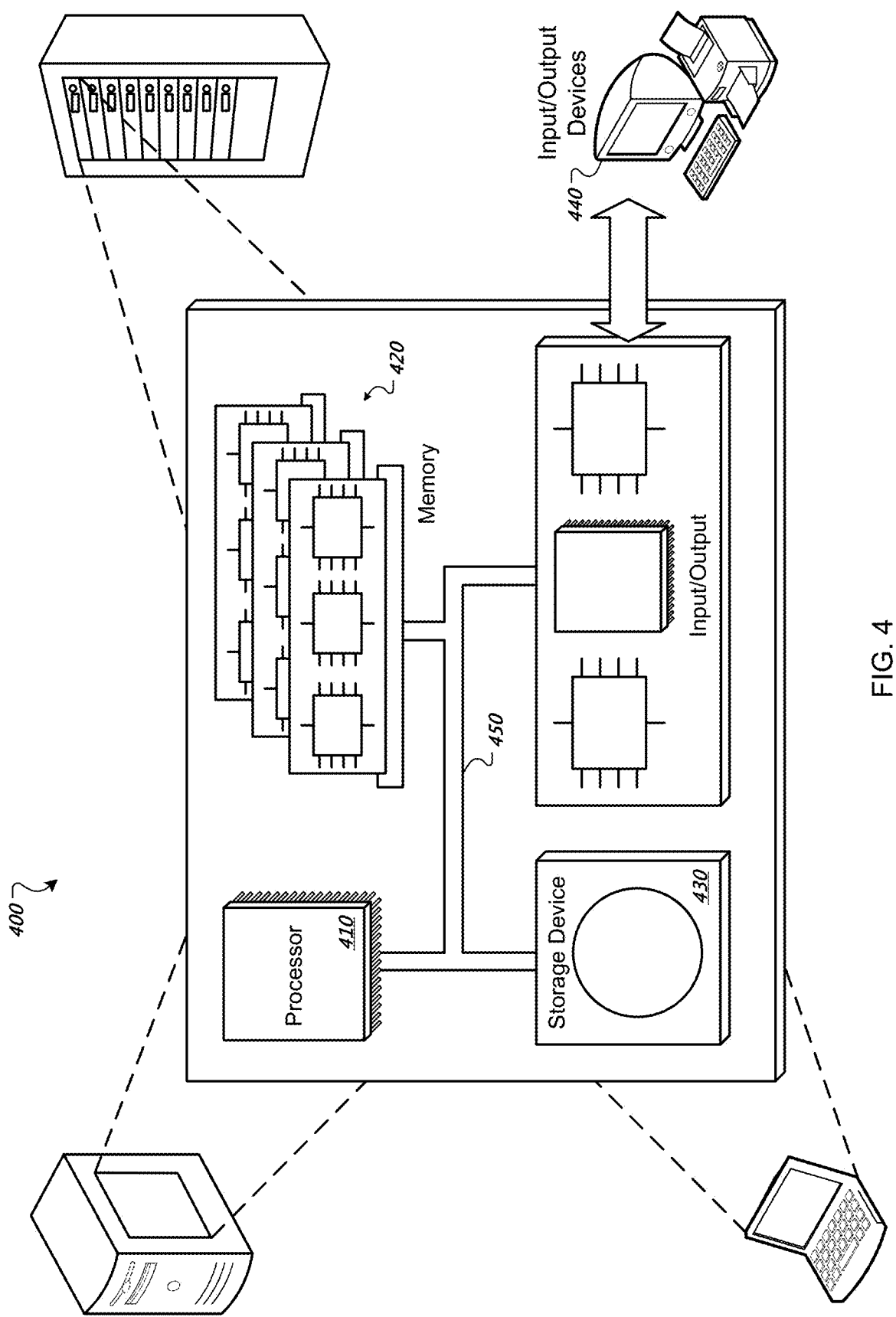
FIG. 4 is a schematic diagram showing an example system for implementing the features described in reference to FIGS. 1-3.

FIG. 4 is a schematic diagram of a generic computer system 400. The system 400 may be used for the operations described in association with any of the computer-implement methods described previously, according to one implementation. The system 400 includes a processor 410, a memory 420, a storage device 430, and an input/output device 440. Each of the components 410, 420, 430, and 440 are interconnected using a system bus 450. The processor 410 is capable of processing instructions for execution within the system 400. In one implementation, the processor 410 is a single-threaded processor. In another implementation, the processor 410 is a multi-threaded processor. The processor 410 is capable of processing instructions stored in the memory 420 or on the storage device 430 to display graphical information for a user interface on the input/output device 440.

The memory 420 stores information within the system 400. In one implementation, the memory 420 is a computer-readable medium. In one implementation, the memory 420 is a volatile memory unit. In another implementation, the memory 420 is a non-volatile memory unit.

The storage device 430 is capable of providing mass storage for the system 400. In one implementation, the storage device 430 is a computer-readable medium. In various different implementations, the storage device 430 may be a floppy disk device, a hard disk device, an optical disk device, or a tape device.

The input/output device 440 provides input/output operations for the system 400. In one implementation, the input/output device 440 includes a keyboard and/or pointing device. In another implementation, the input/output device 440 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier, e.g., in a machine-readable storage device, for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

A number of embodiments have been described. Nevertheless, it will be understood that various modifications may be made without departing from the spirit and scope of this disclosure. Accordingly, other embodiments are within the scope of the following claims.

What is claimed is:
1. A computer-implemented method comprising:
 storing, in a cache of a content exchange, historical data including past actual static bids submitted by a plurality of content networks;
 receiving, at the content exchange, a plurality of proxy bids from the plurality of content networks for an impression associated with a particular category;
 determining, by the content exchange, a subset of the plurality of content networks to which call backs will be sent to request actual static bids from the content networks in the subset, wherein the determining comprises, for each of the content networks:
  identifying, using the historical data, whether the particular category is a category of impressions for which the past actual static bids submitted by the respective content network were winning bids for less than a specified portion of impressions;
  determining not to make a call back to the respective content network when the particular category is a category of impressions for which the past actual static bids submitted by the respective content network were winning bids for less than a specified portion of impressions; and
  excluding the respective content network from the subset of the plurality of content networks based on the determination not to make a call back to the respective content network; and
 sending call backs to the subset of the plurality of networks.

2. The computer-implemented method of claim 1, wherein the historical bid data includes values of the bids, targeting criteria associated with the bids, and whether or not the bids submitted were chosen as winning bids.

3. The computer-implemented method of claim 1, further comprising:
at a later time, determining that the particular content network has submitted winning actual static bids; and
increasing a frequency of call backs to the particular content network for impressions associated with the particular category.

4. The computer-implemented method of claim 1, wherein the content exchange makes a call back to content networks that historically submit non-competitive bids for every tenth auction for impressions in the particular category.

5. A system comprising: a processor;
a computer-readable medium operatively coupled to the processor and including instructions, which, when executed by the processor, causes the processor to perform operations comprising:
storing, in a cache of a content exchange, historical data including past actual static bids submitted by a plurality of content networks;
receiving, at the content exchange, a plurality of proxy bids from the plurality of content networks for an impression associated with a particular category;
determining, by the content exchange, a subset of the plurality of content networks to which call backs will be sent to request actual static bids from the content networks in the subset, wherein the determining comprises, for each of the content networks:
identifying, using the historical data, whether the particular category is a category of impressions for which the past actual static bids submitted by the respective content network were winning bids for less than a specified portion of impressions;
determining not to make a call back to the respective content network when the particular category is a category of impressions for which the past actual static bids submitted by the respective content network were winning bids for less than a specified portion of impressions; and
excluding the respective content network from the subset of the plurality of content networks based on the determination not to make a call back to the respective content network; and
sending call backs to the subset of the plurality of networks.

6. The system of claim 5, wherein the historical bid data includes values of the bids, targeting criteria associated with the bids, and whether or not the bids submitted were chosen as winning bids.

7. The system of claim 5, the operations further comprising:
at a later time, determining that the particular content network has submitted winning actual static bids; and
increasing a frequency of call backs to the particular content network for impressions associated with the particular category.

8. The system of claim 5, wherein the content exchange makes a call back to content networks that historically submit non-competitive bids for every tenth auction for impressions in the particular category.

\* \* \* \* \*

UNITED STATES PATENT AND TRADEMARK OFFICE
CERTIFICATE OF CORRECTION

| | | |
|---|---|---|
| PATENT NO. | : 10,664,874 B2 | Page 1 of 1 |
| APPLICATION NO. | : 15/464992 | |
| DATED | : May 26, 2020 | |
| INVENTOR(S) | : Heilig et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 453 days.

Signed and Sealed this
Fifteenth Day of March, 2022

Drew Hirshfeld
*Performing the Functions and Duties of the*
*Under Secretary of Commerce for Intellectual Property and*
*Director of the United States Patent and Trademark Office*